(12) United States Patent
Kameyama (10) Patent No.: US 8,437,048 B2
(45) Date of Patent: May 7, 2013

(54) IMAGE TRIMMING METHOD, APPARATUS AND PROGRAM

(75) Inventor: Hirokazu Kameyama, Kanagawa-ken (JP)

(73) Assignee: Fujifilm Corporation (JP)

( * ) Notice: Subject to any disclaimer, the term of this patent is extended or adjusted under 35 U.S.C. 154(b) by 1217 days.

(21) Appl. No.: 11/723,682

(22) Filed: Mar. 21, 2007

(65) Prior Publication Data

US 2007/0223047 A1    Sep. 27, 2007

(30) Foreign Application Priority Data

Mar. 22, 2006    (JP) ................. 2006-078191

(51) Int. Cl.
*H04N 1/23*    (2006.01)

(52) U.S. Cl.
USPC ........ 358/302; 358/537; 358/538; 348/240.1; 348/240.2; 348/240.3; 348/240.99

(58) Field of Classification Search .............. 348/240.1, 348/240.2, 240.3, 240.99; 358/302, 537, 358/538
See application file for complete search history.

(56) References Cited

U.S. PATENT DOCUMENTS

| | | | |
|---|---|---|---|
| 7,250,968 B2 * | 7/2007 | Ito | 348/240.2 |
| 2003/0025812 A1 * | 2/2003 | Slatter | 348/240.2 |
| 2005/0012833 A1 * | 1/2005 | Yokota et al. | 348/240.99 |
| 2006/0098256 A1 * | 5/2006 | Kameyama | 358/537 |
| 2006/0290792 A1 * | 12/2006 | Nikkanen et al. | 348/240.2 |
| 2007/0229693 A1 * | 10/2007 | Kameyama et al. | 348/333.01 |

FOREIGN PATENT DOCUMENTS

JP    2005-175684 A    6/2005

* cited by examiner

*Primary Examiner* — King Poon
*Assistant Examiner* — Lawrence Wills
(74) *Attorney, Agent, or Firm* — Studebaker & Brackett PC; Donald R. Studebaker (57) ABSTRACT

When trimming is performed on a photograph image obtained by a photography apparatus, a plurality of trimming range candidates is set by analyzing the photograph image. A judgment is made as to whether the zoom magnification ratio of the photography apparatus during photography corresponds to a predetermined limit, the limit being a maximum zoom magnification ratio or a minimum zoom magnification ratio that can be set by the photography apparatus. A trimming range is set by selecting one of the plurality of trimming range candidates. If the zoom magnification ratio is judged to be a magnification ratio corresponding to the predetermined limit, a trimming range candidate that has a smaller or larger range than that of a trimming range candidate selected if the zoom magnification ratio is judged to be a magnification ratio that does not correspond to the predetermined limit is selected as the trimming range.

17 Claims, 5 Drawing Sheets

IMAGE TRIMMING METHOD, APPARATUS AND PROGRAM

BACKGROUND OF THE INVENTION

1. Field of the Invention

The present invention relates to an image trimming method and an image trimming apparatus for automatically trimming an image obtained by a photography apparatus, such as a digital camera. The present invention also relates to a program for the image trimming method and the image trimming apparatus.

2. Description of the Related Art

Conventionally, trimming processing has been performed by cutting out a part of a photograph image obtained by a photography apparatus, such as a digital camera. The trimming processing is processing for correcting the composition of the photograph image to composition intended by the photographer of the photograph image or to objectively more desirable composition. Further, such trimming processing can be relatively easily performed using general computer software for image processing.

However, when a general user performs trimming processing, it is difficult to judge what kind of composition is objectively most desirable. Further, there is also a problem that the operation of software for setting a trimming range (trimming region) is complicated.

To solve such problems, a method for automatically setting a trimming range that is appropriate for an image has been proposed. In the method for automatically setting the trimming range, the trimming range is set by analyzing the characteristic of a photograph image or photography conditions. For example, a trimming method has been proposed in Japanese Unexamined Patent Publication No. 2005-175684. In the method proposed in Japanese Unexamined Patent Publication No. 2005-175684, a photographer selects the photography mode (portrait mode/scenery mode) of a photography apparatus. Then, an image analysis that is appropriate for the selected photography mode is made on an image obtained by photography, and a trimming range of the image obtained by photography is determined based on the result of the analysis. Then, trimming is performed based on the trimming range.

However, even if as disclosed in Japanese Unexamined Patent Publication No. 2005-175684, the characteristic of an image obtained by photography is analyzed and a trimming range is determined based on the result of the analysis, the intention of a photographer at the time of photography might not be sufficiently reflected in an image obtained by trimming. Therefore, the composition of the image might not sufficiently satisfy users in some cases.

For example, most of currently-sold photography apparatuses, such as digital cameras, have zoom functions. When the composition of an image obtained by such a photography apparatus is a relatively wide angle composition, it is impossible to judge whether the photographer of the image intentionally selected the wide angle composition without zooming or the composition of the image became the wide angle composition because the performance of the zoom function of the photography apparatus was limited. Hence, it is impossible to perform desirable trimming in some cases.

Figure 7:
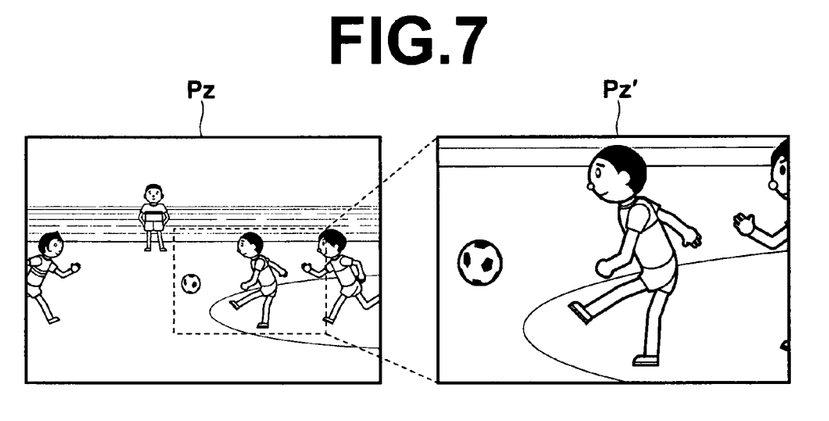
FIG. 7 is a diagram illustrating an example of two photograph images of the same scene but with different composition from each other.

FIG. 7 is a diagram illustrating an example of two photograph images of the same scene but with different composition. The composition of image Pz is relatively wide angle composition with respect to persons who are the subject of photography. A plurality of children playing football (soccer) is in the whole photograph image. Meanwhile, image Pz' has composition including a close-up of a specific child who is substantially at the center of the photograph image. Generally, even if image Pz is observed, it is impossible to judge whether the photographer of the image intentionally selected the wide angle composition without zooming or although he/she originally wanted to obtain an image like image Pz', an image with such wide angle composition was obtained because the performance of the zoom function of the photography apparatus was limited.

SUMMARY OF THE INVENTION

In view of the foregoing circumstances, it is an object of the present invention to provide an image trimming method and an image trimming apparatus for trimming a photograph image, by taking the intention of the photographer of the image as to zooming into consideration, so that the composition of the photograph image is corrected to more desirable composition. It is also an object of the present invention to provide a program for the image trimming method and the image trimming apparatus.

An image trimming method of the present invention is an image trimming method for automatically trimming a photograph image obtained by a photography means, the method comprising the steps of:

setting a plurality of trimming range candidates by analyzing the photograph image;

judging whether the zoom magnification ratio of the photography means during obtainment of the photograph image corresponds to a predetermined limit, the limit being one of a maximum zoom magnification ratio and a minimum zoom magnification ratio that can be set by the photography means; and setting a trimming range by selecting one of the plurality of trimming range candidates as the trimming range, wherein if the zoom magnification ratio is judged to be a magnification ratio corresponding to the predetermined limit, a trimming range candidate that has a smaller or larger range than that of a trimming range candidate selected if the zoom magnification ratio is judged to be a magnification ratio that does not correspond to the predetermined limit is selected as the trimming range.

In the image trimming method of the present invention, if the zoom magnification ratio is judged to be a magnification ratio corresponding to the predetermined limit, a trimming range may be set by selecting, as the trimming range, a trimming range candidate that has one of a smallest range and a largest range from the plurality of trimming range candidates.

The image trimming method of the present invention may be an image trimming method further comprising the step of:

obtaining zoom magnification ratio information for specifying the zoom magnification ratio and machine type information representing the machine type of the photography means, wherein the judgment as to the zoom magnification ratio is made, based on the zoom magnification ratio information, by referring to a specification of a zoom corresponding to the machine type represented by the machine type information, the specification of the zoom being selected from specifications of zooms of photography means of respective machine types, the specifications being prepared in advance.

In the image trimming method of the present invention, the plurality of trimming range candidates may be set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

In the image trimming method of the present invention, the zoom magnification ratio may include an optical zoom magnification ratio and an electronic zoom magnification ratio. If both of the optical zoom magnification ratio and the electronic zoom magnification ratio correspond to the predetermined limit, the zoom magnification ratio may be judged to be a magnification ratio corresponding to the predetermined limit.

In the image trimming method of the present invention, the zoom magnification ratio may include an optical zoom magnification ratio. A judgment may be made as to whether the optical zoom magnification ratio is a maximum magnification ratio. If the optical zoom magnification ratio is judged to be the maximum magnification ratio, distortion correction processing may be performed on an image in the trimming range.

Further, in the image trimming method of the present invention, the zoom magnification ratio may include an electronic zoom magnification ratio. A judgment may be made as to whether the electronic zoom magnification ratio is a maximum magnification ratio. If the electronic zoom magnification ratio is judged to be the maximum magnification ratio, sharpness processing may be performed on an image in the trimming range.

An image trimming apparatus of the present invention is an image trimming apparatus for automatically trimming a photograph image obtained by a photography means, the apparatus comprising:

a trimming range candidate setting means for setting a plurality of trimming range candidates by analyzing the photograph image;

a zoom magnification ratio judgment means for judging whether the zoom magnification ratio of the photography means during obtainment of the photograph image corresponds to a predetermined limit, the limit being one of a maximum zoom magnification ratio and a minimum zoom magnification ratio that can be set by the photography means; and a trimming range setting means for setting a trimming range by selecting one of the plurality of trimming range candidates as the trimming range, wherein if the zoom magnification ratio is judged to be a magnification ratio corresponding to the predetermined limit, a trimming range candidate that has a smaller or larger range than that of a trimming range candidate selected if the zoom magnification ratio is judged to be a magnification ratio that does not correspond to the predetermined limit is selected as the trimming range.

In the image trimming apparatus of the present invention, if the zoom magnification ratio is judged to be a magnification ratio corresponding to the predetermined limit, the trimming range setting means may set a trimming range by selecting, as the trimming range, a trimming range candidate that has one of a smallest range and a largest range from the plurality of trimming range candidates.

The image trimming apparatus of the present invention may be an image trimming apparatus further comprising:

an information obtainment means for obtaining zoom magnification ratio information for specifying the zoom magnification ratio and machine type information representing the machine type of the photography means; and a storage means for storing specifications of zooms of photography means of respective machine types, wherein the zoom magnification ratio judgment means judges by referring to a specification of a zoom corresponding to the machine type represented by the machine type information, the specification of the zoom being selected from the specifications of the zooms stored in the storage means.

In the image trimming apparatus of the present invention, the trimming range candidate setting means may set the plurality of trimming range candidates by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

In the image trimming apparatus of the present invention, the zoom magnification ratio may include an optical zoom magnification ratio and an electronic zoom magnification ratio. If both of the optical zoom magnification ratio and the electronic zoom magnification ratio correspond to the predetermined limit, the zoom magnification ratio judgment means may judge that the zoom magnification ratio corresponds to the predetermined limit.

In the image trimming apparatus of the present invention, the zoom magnification ratio may include an optical zoom magnification ratio, and the zoom magnification ratio judgment means may judge whether the optical zoom magnification ratio is a maximum magnification ratio. The image trimming apparatus may further include a distortion correction processing means. If the optical zoom magnification ratio is judged to be the maximum magnification ratio, the distortion correction processing means may perform distortion correction processing on an image in the trimming range.

In the image trimming apparatus of the present invention, the zoom magnification ratio may include an electronic zoom magnification ratio. The zoom magnification ratio judgment means may judge whether the electronic zoom magnification ratio is a maximum magnification ratio. The apparatus may further include a sharpness processing means. If the electronic zoom magnification ratio is judged to be the maximum magnification ratio, the sharpness processing means may perform sharpness processing on an image in the trimming range.

A program of the present invention may be a program for causing a computer to function as an image trimming apparatus for automatically trimming a photograph image obtained by a photography means, wherein the computer functions as:

a trimming range candidate setting means for setting a plurality of trimming range candidates by analyzing the photograph image;

a zoom magnification ratio judgment means for judging whether the zoom magnification ratio of the photography means during obtainment of the photograph image corresponds to a predetermined limit, the limit being one of a maximum zoom magnification ratio and a minimum zoom magnification ratio that can be set by the photography means; and a trimming range setting means for setting a trimming range by selecting one of the plurality of trimming range candidates as the trimming range, wherein if the zoom magnification ratio is judged to be a magnification ratio corresponding to the predetermined limit, a trimming range candidate that has a smaller or larger range than that of a trimming range candidate selected if the zoom magnification ratio is judged to be a magnification ratio that does not correspond to the predetermined limit is selected as the trimming range.

In the program of the present invention, if the zoom magnification ratio is judged to be a magnification ratio corresponding to the predetermined limit, the trimming range setting means may set a trimming range by selecting, as the trimming range, a trimming range candidate that has one of a smallest range and a largest range from the plurality of trimming range candidates.

The program of the present invention may cause the computer to further function as:

an information obtainment means for obtaining zoom magnification ratio information for specifying the zoom magnification ratio and machine type information representing the machine type of the photography means; and a storage means for storing specifications of zooms of photography means of respective machine types. The zoom magnification ratio judgment means may judge, based on the zoom magnification information, by referring to a specification of a zoom corresponding to the machine type represented by the machine type information, the specification of the zoom being selected from the specifications of the zooms stored in the storage means.

In the program of the present invention, the trimming range candidate setting means may set the plurality of trimming range candidates by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

In the program of the present invention, the zoom magnification ratio may include an optical zoom magnification ratio and an electronic zoom magnification ratio. If both of the optical zoom magnification ratio and the electronic zoom magnification ratio correspond to the predetermined limit, the zoom magnification ratio judgment means may judge that the zoom magnification ratio corresponds to the predetermined limit.

In the program of the present invention, the zoom magnification ratio may include an optical zoom magnification ratio, and the zoom magnification ratio judgment means may judge whether the optical zoom magnification ratio is a maximum magnification ratio. The program may cause the computer to further function as a distortion correction processing means. If the optical zoom magnification ratio is judged to be the maximum magnification ratio, the distortion correction processing means may perform distortion correction processing on an image in the trimming range.

In the program of the present invention, the zoom magnification ratio may include an electronic zoom magnification ratio, and the zoom magnification ratio judgment means may judge whether the electronic zoom magnification ratio is a maximum magnification ratio. The program may cause the computer to further function as a sharpness processing means. If the electronic zoom magnification ratio is judged to be the maximum magnification ratio, the sharpness processing means may perform sharpness processing on an image in the trimming range.

As the photography means, a digital still camera, a digital video camera or the like may be used, for example.

As the method for "judging whether the zoom magnification ratio . . . corresponds to a predetermined limit, the limit being one of a maximum zoom magnification ratio and a minimum zoom magnification ratio that can be set by the photography means", there are methods as described above.

In the methods as described above, a judgment is made based on information that can specify the zoom magnification ratio at the time of photography by receiving the information and by referring to a specification of the zoom of the photography means. Alternatively, a judgment may be made, based on information representing that the zoom magnification ratio corresponds to the predetermined limit, by receiving the information, or the like.

As the information that can specify the zoom magnification ratio, information representing the zoom magnification ratio itself, information representing the focal length of a zoom lens, information representing the extension/contraction position of the zoom lens, information representing the position of a gear of a zoom lens drive system or the like may be used, for example.

Further, as information representing that the zoom magnification ratio corresponds to the predetermined limit, an electric signal or data output from a detector for detecting that a zoom magnification ratio has reached a magnification ratio corresponding to the predetermined limit may be used for example. Such a detector may be included in the photography means, and the detector may be configured either by hardware or by software. Further, the data may be attached to the photograph image as supplementary information and the data may be received by the trimming apparatus together with the photograph image. Alternatively, the data may be received by the trimming apparatus separately from the photograph image.

The specification of the zoom of the photography means may include the maximum/minimum values of the optical focal length of the photography means, the maximum/minimum values of the electronic zoom magnification ratio of the photography means, or the like for example.

Further, as a method for referring to such specification, the specification of the zoom of the photography means may be stored in a database of the trimming apparatus and the specification may be referred to by reading out the specification from the database. In such a case, the specification may be stored in the database by obtaining the specification from the manufacturer of the photography means or the like in advance. Alternatively, the specification may be obtained by directly downloading information from the website of the manufacturer of the photography means via the Internet and the obtained specification may be stored in the database. Alternatively, the specification may be stored in the database by using a computer-readable storage medium provided by the manufacturer of the photography means. Alternatively, the specification may be stored in the database by manual input by the user of the trimming apparatus.

When a judgment is made as to whether the zoom magnification ratio is a magnification ratio corresponding to the predetermined limit, if the machine type of the photography means that was used to obtain the photograph image has not been determined in advance, it is necessary to identify the machine type (the company name of the manufacturer, the model name and the like) of the photography means and to refer to the specification of the identified machine type. For example, the machine type may be identified by reading machine type information about the photography means that is included in tag information attached to the photograph image. Alternatively, a list of machine types of photography means maybe prepared in advance and the user may specify a machine type by manually selecting the machine type from the list.

As the predetermined object, a human body, a person's face, an animal, a plant, the ground, the sky, a structure (landmark) or the like may be used, for example.

As a method for calculating the degree of interest, a conversion curve showing correspondence between a predetermined kind of characteristic value and the degrees of interest may be prepared in advance for example. The predetermined kind of characteristic value is determined by the type of the object. Then, the predetermined kind of characteristic value may be calculated for each detected object. Further, the degree of interest may be calculated based on the characteristic value using the conversion curve corresponding to the kind of the object.

As the characteristic value, the brightness of the object (an average pixel value of pixels forming an image corresponding to the object), the size of the object (the area of the object relative to the area of the photograph image), the position of the object (a coordinate in the photograph image) or the like may be used. Regarding the brightness, it is most likely that a subject in which a photographer had interest has appropriate brightness (lightness) in the photograph image. Therefore, if the brightness of the object is too low or too high, the degree of interest of the object may be set to a low level. Further, regarding the size, it is most likely that a subject in which the photographer had interest has a large size. Therefore, as the size of the subject is larger, the degree of interest may be set to a higher value. Further, regarding the position, it is most likely that a subject in which the photographer had interest is positioned close to the center of the photograph image. Therefore, if the subject is positioned in the vicinity of the outer edge of the image, the degree of interest may be set to a low level.

The degree of interest may be calculated using a characteristic other than the characteristic that appears in the image. For example, the degree of interest may be calculated using the photography mode of the photography apparatus, such as a portrait mode and a landscape mode, and information, such as a photography place detected by GPS (Global Positioning System) and photography conditions. If the photography mode is a portrait mode, it is most likely that the photograph is a portrait photograph. Therefore, the degrees of interest may be set by weighting the degree of interest of an object that is a human face. Similarly, if the photography mode is a landscape mode, it is most likely that the photograph is a photograph of a structure or nature (scenery). Therefore, the degrees of interest may be set by weighting the degree of interest of an object that is a structure or a plant. If the place of photography is a holiday spot and there is a unique landmark in the holiday spot, the degree of interest may be set by weighting the degree of interest of an object that is the landmark.

Further, in the present invention, when a trimming frame is set as a candidate, the trimming frame may be set so that the whole area of an object of which the degree of interest is greater than or equal to a predetermined threshold value is included in the trimming frame. Alternatively, the trimming frame may be set so that the whole area of a major part of the object (for example, a region substantially at the center of the object, the area of the region being greater than or equal to 50% of the area of the whole object) is included in the trimming frame. Further, when a trimming frame candidate is set, the combination of the position and the type of each object or the like may be taken into consideration so that the composition of the image becomes more natural.

The optical zoom is a zoom for enlarging or reducing the size of an image to be obtained by using an optical system, such as a lens. Further, the electronic zoom is a zoom for enlarging or reducing the size of an image to be obtained by performing image processing. In the image processing, a part of an image obtained by an imaging device of the photography apparatus is cut out, and the size of the cutout image per unit pixels is converted.

In the present invention, a judgment may be made as to whether the zoom magnification ratio is the maximum magnification ratio. Then, if it is judged that the zoom magnification ratio is the maximum magnification ratio, a trimming range may be set by selecting a candidate of which the range is the smallest from the plurality of candidates. Alternatively, a judgment may be made as to whether the zoom magnification ratio is the minimum magnification ratio. Then, if it is judged that the zoom magnification ratio is the minimum magnification ratio, a trimming range may be set by selecting a candidate of which the range is the largest from the plurality of candidates.

In the latter case, namely when a candidate of which the range is the largest is selected, the candidate of which the range is the largest includes a candidate of which the size is the same as that of the photograph image. Specifically, if it is judged that the zoom magnification ratio is the minimum magnification, it is not necessary that trimming is performed.

In the image trimming method and the image trimming apparatus of the present invention, a judgment is made as to whether the zoom magnification ratio of the photography means during obtainment of the photograph image corresponds to a predetermined limit, the limit being one of a maximum zoom magnification ratio and a minimum zoom magnification ratio that can be set by the photography means. Further, if the zoom magnification ratio is judged to be a magnification ratio corresponding to the predetermined limit, a trimming range candidate that has a smallest range or a largest range is selected from a plurality of trimming range candidates and set as a trimming range of the photograph image. Therefore, it is possible to infer whether the composition of the photograph image was intended by the photographer of the photograph image or the composition was not intended by the photographer but obtained because of limitations in the zoom performance of the photography apparatus. The result of inference can be reflected in the processing for setting the trimming range. Hence, it is possible to perform trimming on the photograph image, by taking the intention of the photographer of the image as to zooming into consideration, so that the composition of the photograph image is corrected to more desirable composition.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Hereinafter, embodiments of the present invention will be described with reference to the attached drawings.

Figure 1:
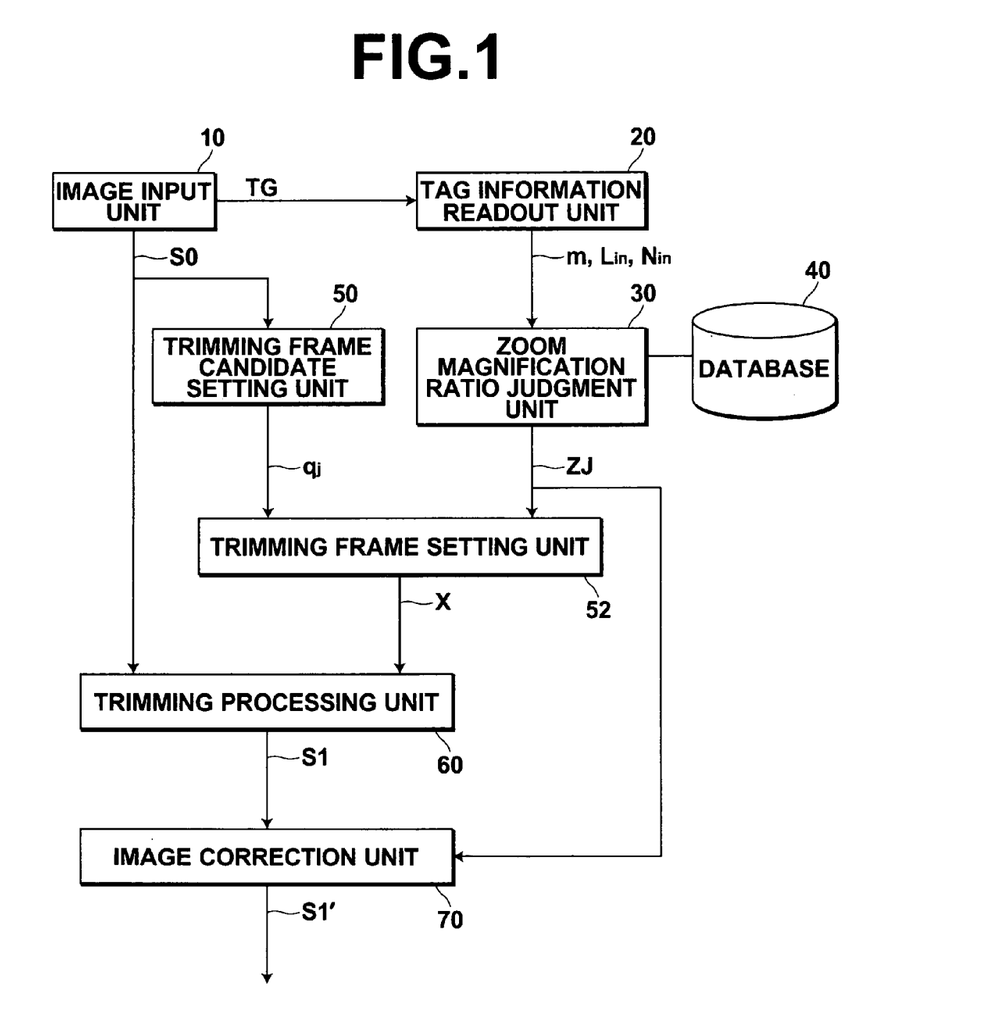
FIG. 1 is a block diagram illustrating the configuration of an image trimming apparatus in an embodiment of the present invention.

FIG. 1 is a block diagram illustrating the configuration of an image trimming apparatus according to an embodiment of the present invention. The image trimming apparatus is a system for trimming an image based on a trimming frame by setting the trimming frame in the image. The trimming frame is set by detecting a region that has a high degree of interest in the image and by setting the trimming frame so that the region that has the high degree of interest is included in the trimming frame. The image trimming apparatus is implemented by causing a computer (for example, a personal computer or the like) to execute a processing program that has been read in a supplementary storage apparatus. Further, the processing program is stored in a data storage medium, such as a CD-ROM, or distributed through a network, such as the Internet. Then, the processing program is installed in the computer. Further, image data is data representing an image. In the following description, the term "image" and the term "image data" are used without particularly distinguishing them from each other.

As illustrated in FIG. 1, the image trimming apparatus according to the embodiment of the present invention includes an image input unit 10, a tag information readout unit (information obtainment means) 20, a zoom magnification ratio judgment unit (zoom magnification ratio judgment means) 30, a database (storage means) 40, a trimming frame candidate setting unit (trimming range candidate setting means) 50, a trimming frame setting unit (trimming range setting means) 52, a trimming processing unit 60 and an image correction unit (distortion correction processing means and sharpness processing means) 70. The image input unit 10 receives photograph image S0, obtained by a photography apparatus. The tag information readout unit 20 reads tag information TG from photograph image S0. Tag information TG is supplementary information attached to photograph image S0. Tag information TG includes information, such as machine type m of photography apparatus M, which was used to obtain photograph image S0 by photography, optical focal length (hereinafter, referred to as input optical focal length) Lin during photography by the photography apparatus and electronic zoom magnification ratio (hereinafter, referred to as input electronic zoom magnification ratio) Nin during photography by the photography apparatus. The zoom magnification ratio judgment unit 30 refers to information about the specification of the zoom of a photography apparatus of machine type m by reading information from the database 40, which will be described later. Then, the zoom magnification ratio judgment unit 30 judges whether an optical zoom magnification ratio specified by input optical focal length Lin is the maximum magnification ratio that can be set by the photography apparatus of machine type m and whether an electronic zoom magnification ratio represented by input electronic zoom magnification ratio Nin is the maximum magnification ratio that can be set by the photography apparatus of machine type m. Further, the zoom magnification ratio judgment unit 30 outputs these judgment results ZJ. In the database 40, information about the specification of the zoom of each photography apparatus of various machine types is stored. The trimming frame candidate setting unit 50 analyzes photograph image S0 and sets a plurality of trimming frame candidates qj. The trimming frame setting unit 52 sets trimming frame X by selecting, based on judgment results ZJ, one of the plurality of trimming frame candidates as trimming frame X. The trimming processing unit 60 obtains trimming image S1 by performing trimming on photograph image S0 based on trimming frame X. The image correction unit 70 performs, based on judgment results ZJ, various kinds of correction processing on trimming image S1 and obtains corrected trimming image S1'.

The image input unit 10 receives an input of photograph image S0 and stores photograph image S0 in a memory (not illustrated). For example, users can input snapshot images obtained by a digital camera or the like through the image input unit 10. The image input unit 10 may receive inputs of photograph images S0 one by one. Alternatively, the image input unit 10 may receive inputs of a plurality of photograph images S0 at once. Further, tag information TG, which is supplementary information attached to photograph image S0, is present.

The tag information readout unit 20 reads out tag information TG, which is supplementary information attached to input photograph image S0, from input photograph image S0. Tag information TG includes various kinds of information representing photography conditions during obtainment of photograph image S0. The various kinds of information representing the photography conditions includes the machine type of photography apparatus M that was used in photography, the aperture stop of photography apparatus M during photography, the shutter speed of photography apparatus M, the light receiving sensitivity of photography apparatus M, the focal length of the optical system of photography apparatus M, the electronic zoom magnification ratio of photography apparatus M, the date of photography or the like. The tag information readout unit 20 particularly reads machine type m of photography apparatus M, input optical focal length Lin and input electronic zoom magnification ratio Nin from such information. Input optical focal length Lin is the focal length of the optical system of photography apparatus M during photography, and input electronic zoom magnification ratio Nin is an electronic zoom magnification ratio of photography apparatus M during photography. Then, the tag information readout unit 20 outputs the readout information to the zoom magnification ratio judgment unit 30.

The zoom magnification ratio judgment unit 30 reads out information about the specification of the zoom corresponding to machine type m of the photography apparatus from the database 40. The zoom magnification ratio judgment unit 30 refers to the specification information and judges whether an optical zoom magnification ratio specified by input optical focal length Lin is the maximum optical zoom magnification ratio that can be set by the photography apparatus of machine type m and whether an electronic zoom magnification ratio represented by input electronic zoom magnification ratio Nin is the maximum electronic zoom magnification ratio that can be set by the photography apparatus of machine type m. Accordingly, the zoom magnification ratio judgment unit 30 obtains these judgment results ZJ.

Specifically, reference optical focal length $Lref_i$ and reference electronic zoom magnification ratio $Nref_i$ for each machine type of photography apparatus are stored in the database 40, for example. Reference optical focal length $Lref_i$ is focal length when the optical zoom magnification ratio is the maximum magnification ratio. Reference electronic zoom magnification ratio $Nref_i$ is a zoom magnification ratio when the electronic zoom magnification ratio is the maximum magnification ratio. The zoom magnification ratio judgment unit 30 reads out reference optical focal length $Lref_m$ and reference electronic zoom magnification ratio $Nref_m$ corresponding to the photography apparatus of machine type m from the database 40. Then, the zoom magnification ratio judgment unit 30 compares input optical focal length Lin with reference optical focal length $Lref_m$ and judges whether input optical focal length Lin and reference optical focal length $Lref_m$ are the same. Accordingly, the zoom magnification ratio judgment unit 30 judges whether an optical zoom magnification ratio specified by input optical focal length Lin is the maximum optical zoom magnification ratio that can be set by the photography apparatus of machine type m. Further, the zoom magnification ratio judgment unit 30 compares input electronic zoom magnification ratio Nin with reference electronic zoom magnification ratio $Nref_m$ and judges whether input electronic zoom magnification ratio Nin and reference electronic zoom magnification ratio $Nref_m$ are the same. Accordingly, the zoom magnification ratio judgment unit 30 judges whether an electronic zoom magnification ratio represented by input electronic zoom magnification ratio Nin is the maximum electronic zoom magnification ratio that can be set by the photography apparatus of machine type m. If only the maximum optical zoom magnification ratio that can be set by the photography apparatus of machine type m can be referred to, an optical zoom magnification ratio is calculated based on input optical focal length Lin and the maximum optical zoom magnification ratio and the calculated optical zoom magnification ratio are compared with each other.

The trimming frame setting unit 50 analyzes photograph image S0 and sets some trimming frame candidates (a plurality of trimming frame candidates) $q_j$ that are appropriate for photograph image S0. This processing will be specifically described.

First, a predetermined kind of object is detected in photograph image S0. As a method for detecting the object, there is a method using classical pattern matching, a method using an object classifier created by learning algorithm that is called boosting, a method using an object classifier created by using a class classification method that is called self-organization map, or the like. Further, as the kind of object to be detected, there is a human face, a plant, the ground, the sky, a structure (landmark) or the like.

Figure 2:
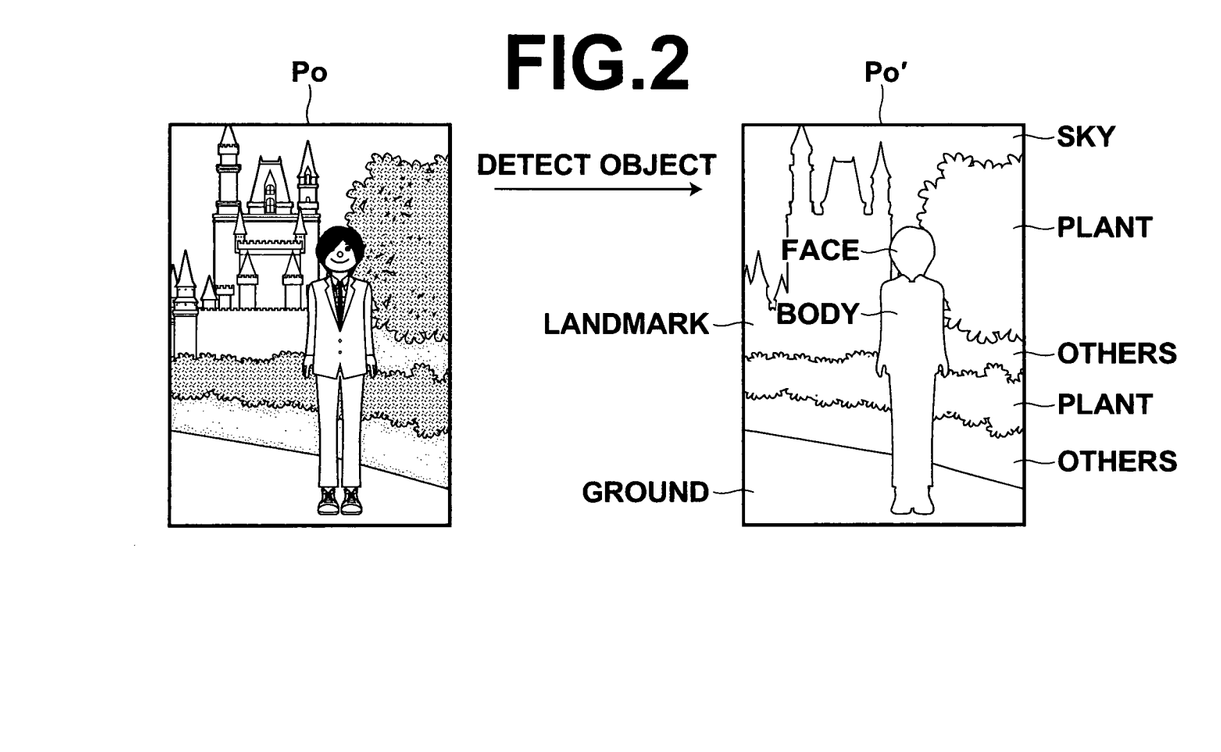
FIG. 2 is a diagram illustrating how various kinds of objects are detected in a photograph image.

FIG. 2 is a diagram illustrating how various kinds of objects are detected in a photograph image. In FIG. 2, image Po is a photograph image of a person against the background of a castle. Image Po' is an image obtained by performing object detection processing on image Po. In image Po', image Po is divided into objects.

After all of the objects are detected, the degree of interest is calculated for each of the detected objects. The degree of interest is a value representing the degree of interest to be directed toward each detected object as a subject. The degree of interest is calculated based on a predetermined criterion. Specifically, a conversion curve is prepared in advance for each kind of object. The conversion curve shows correspondence between a predetermined kind of characteristic value and the degree of interest, and the predetermined kind of characteristic value is determined for each kind of object. The predetermined kind of characteristic value is calculated for each detected object. Then, the degree of interest is calculated based on the characteristic value using a conversion curve corresponding to the kind of the object.

Figure 3:
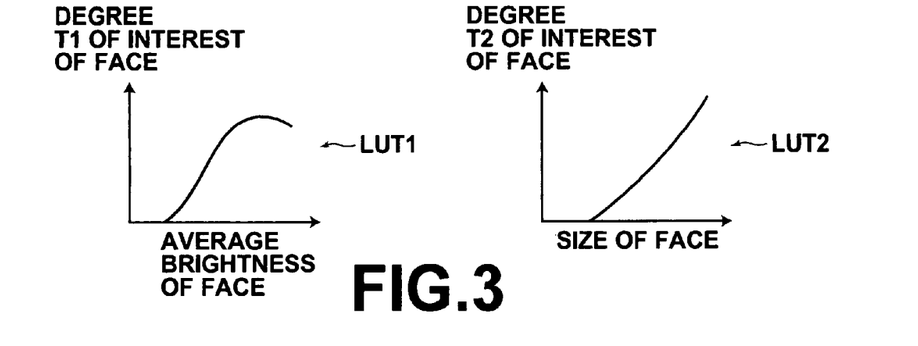
FIG. 3 is a diagram illustrating conversion curves showing correspondence between the characteristic values of objects and the degrees of interest.

For example, if the kind of the object is a human face, two conversion curves corresponding to the kind of the object, as illustrated in FIG. 3, are prepared in advance. In FIG. 3, first conversion curve LUT1 is a conversion curve showing correspondence between the average brightness of the object (face) and degree T1 of interest. Second conversion curve LUT2 is a conversion curve showing correspondence between the size (area) of the object relative to that of photograph image S0 and degree T2 of interest. Therefore, an average brightness of an image representing the detected face and the size of the image representing the detected face are obtained. Then, degree T1 of interest and degree T2 of interest are calculated using the respective conversion curves. Then, obtained degree T1 of interest and degree T2 of interest are added using weighting coefficients so as to obtain final degree Tt of interest ($Tt = a \times T1 + b \times T2$).

After the degree of interest of each of the detected objects is obtained by calculation, a frame including all of an object or objects, each having the degree of interest greater than or equal to a first threshold value, a frame including all of an object or objects, each having the degree of interest greater than or equal to a second threshold value, which is higher than the first threshold value, or the like is set as a trimming frame candidate. When a trimming frame is set as a candidate, the trimming frame may be set so that the whole object that has the degree of interest greater than or equal to a predetermined threshold value is included in the trimming frame. Alternatively, all of a major part (for example, a region positioned approximately at the center of the object, and of which the area is greater than or equal to 50% of the area of the whole object) of the object may be included in the trimming frame. Further, the trimming frame candidate may be set by taking the combination of the position and the kind of each of the objects into consideration so that the composition of the image becomes more natural. Accordingly, a plurality of trimming frame candidates $q_i$ is prepared.

The trimming frame setting unit 52 selects, based on judgment results ZJ, the most appropriate candidate as trimming frame X from the plurality of candidates $q_j$. For example, if the optical zoom magnification ratio specified by input optical focal length Lin is judged to be the maximum optical zoom magnification ratio that can be set by the photography apparatus of machine type m, and if the electronic zoom magnification ratio represented by input electronic zoom magnification ratio Nin is judged to be the maximum electronic zoom magnification ratio that can be set by the photography apparatus of machine type m, a candidate of which the range is the smallest is selected as trimming frame X from the plurality of trimming frame candidates $q_j$. Meanwhile, if judgment results ZJ show that at least one of the optical zoom magnification ratio specified by input optical focal length Lin and the electronic zoom magnification ratio represented by input electronic zoom magnification ratio Nin is not the maximum magnification ratio, one of the plurality of trimming frame candidates $q_j$ other than the candidate that has the smallest range is selected as trimming frame X. For example, a trimming frame candidate that has a largest range is selected.

Processing is performed in such a manner because it is possible to assume that if both of the optical zoom magnification ratio and the electronic zoom magnification ratio of photography apparatus M during obtainment of photograph image S0 are maximum magnification ratios, the composition of photograph image S0 is not composition intended by the photographer. It is assumed that the composition of photograph image S0 was not intended by the photographer but obtained due to limitations in the zoom performance of photography apparatus M. In such a case, a trimming frame candidate that has the smallest range is selected as trimming frame X so that the composition of the photograph image becomes composition with a narrower angle of view, which is close to composition intended by the photographer.

Figures 4A, 4B:
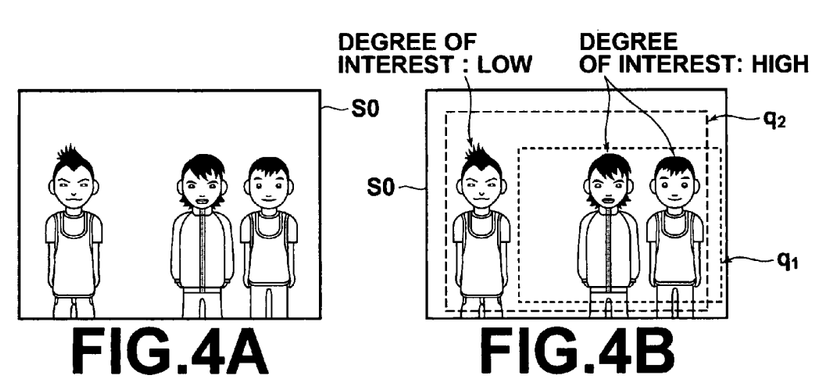
FIG. 4A is a diagram illustrating a relationship between photograph image S0 and trimming frame X.
FIG. 4B is a diagram illustrating a relationship between photograph image S0 and trimming-frame X.
Figure 4C:
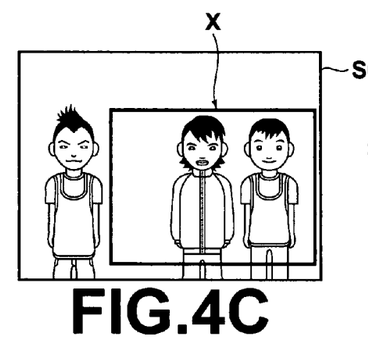
FIG. 4C is a diagram illustrating a relationship between photograph image S0 and trimming frame X.
Figure 4D:
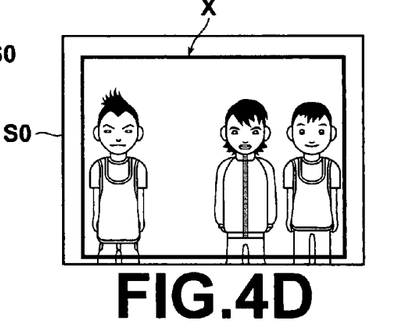
FIG. 4D is a diagram illustrating a relationship between photograph image S0 and trimming frame X.

FIGS. 4A through 4D are diagrams illustrating relationships between photograph image S0 and trimming frames X. FIG. 4A is a diagram illustrating an example of input photograph image S0. In FIG. 4A, the brightness of two persons on the right side of photograph image S0 is appropriate because lighting was sufficient for the two persons during photography. However, a person on the left side of photograph image S0 is dark because lighting was not sufficient for the person. In such a case, it is expected that the degrees of interest with respect to the persons on the right side are higher than the degree of interest with respect to the person on the left side. Consequently, although the degree of interest with respect to each of the three persons is greater than or equal to a first threshold value, only the degrees of interest with respect to the two persons on the right side are higher than a second threshold value, which is higher than the first threshold value, for example. Therefore, it is assumed that a trimming frame candidate including only the two persons on the right side and a trimming frame candidate including all of the three persons are set in some cases. FIG. 4B is a diagram illustrating two trimming frame candidates $q_1$ and $q_2$, which are set in photograph image S0 as described above. The two trimming frame candidates $q_1$ and $q_2$ are trimming frame candidates, of which the ranges are different from each other. Then, one of the two trimming frame candidates $q_1$ and $q_2$ is selected, based on the zoom magnification ratio during obtainment of photograph image S0 by photography apparatus M, as trimming frame X. FIG. 4C is a diagram illustrating a state in which trimming frame candidate $q_1$, which has a smaller range than that of trimming frame candidate $q_2$, is selected as trimming frame X. FIG. 4D is a diagram illustrating a state in which trimming frame candidate $q_2$, which has a larger range than that of trimming frame candidate $q_1$, is selected as trimming frame X.

The trimming processing unit 60 cuts out an image surrounded by trimming frame X from photograph image S0 to obtain trimming image S1, which is a cutout image. At this time, trimming image S1 is enlarged so that the image size of trimming image S1 becomes approximately the same as that of photograph image S0.

The image correction unit 70 performs distortion correction processing or sharpness processing on trimming image S1, if necessary. Specifically, if it is judged, based on judgment result ZJ, that the optical zoom magnification ratio specified by input optical focal length Lin is the maximum optical zoom magnification ratio that can be set by the photograph apparatus of machine type m, the image correction unit 70 performs distortion correction processing on trimming image S1. If it is judged that the electronic zoom magnification ratio represented by input electronic zoom magnification ratio Nin is the maximum electronic zoom magnification ratio that can be set by the photograph apparatus of machine type m, the image correction unit 70 performs sharpness processing on trimming image S1.

Processing is performed in such a manner because a distortion caused by an optical system of a photography apparatus is present in a photograph image obtained by setting the optical zoom magnification ratio to the maximum magnification ratio. An image without distortion is obtained by correcting the photograph image. Meanwhile, the resolution of a photograph image obtained by setting the electronic zoom magnification ratio to the maximum magnification ratio is low, and an edge component of such an image is blurred. Therefore, the blur in the photograph image is corrected.

Figure 5:
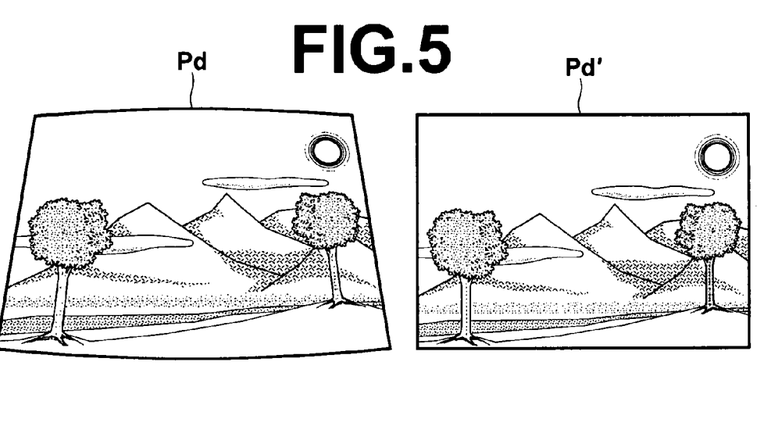
FIG. 5 is a diagram illustrating an example of a distorted image, of which the distortion is caused by an optical system, and an example of an image obtained by correcting the distortion.

FIG. 5 is a diagram illustrating an example of distorted image Pd, of which the distortion is caused by an optical system, and an example of image Pd' obtained by correcting the distortion. Image Pd is an image with distortion caused by the optical system of the photography apparatus, and the shape of image Pd is distorted in a barrel shape. Generally, when the optical zoom magnification ratio is increased, there is a tendency that the shape of the image is distorted in a barrel shape, as illustrated in FIG. 5. If the degree of such distortion is obtained for each machine type of photography apparatus and a correction processing parameter for correcting the distortion for each machine type of photography apparatus is registered in a database, it is possible to perform appropriate distortion correction processing on a trimming image because the machine type of the photography apparatus can be identified based on input machine type information of the photography apparatus.

Similarly, if the degree of blur at edges is obtained for each machine type of photography apparatus and a sharpness processing parameter for correcting the blur for each machine type of photography apparatus is registered in a database, it is possible to perform appropriate sharpness processing on a trimming image because the machine type of the photography apparatus can be identified based on input machine type information of the photography apparatus.

The distortion correction processing and the sharpness processing may be performed before performing trimming processing. Alternatively, the distortion correction processing and the sharpness processing may be performed after performing trimming processing.

Figure 6:
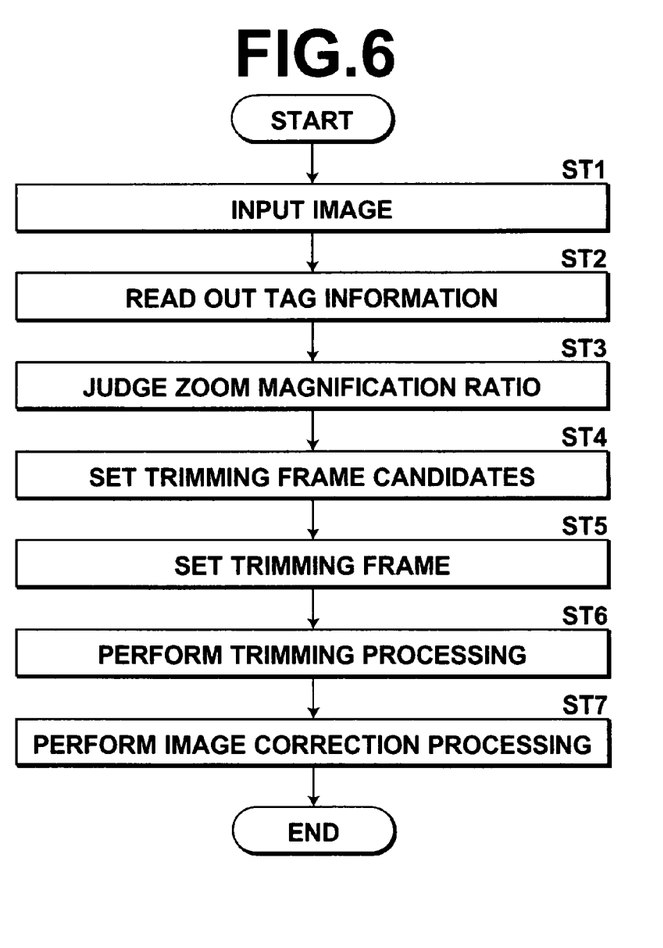
FIG. 6 is a flow chart illustrating processing in the embodiment of the present invention.

Next, processing performed in the present embodiment will be described. FIG. 6 is a flow chart illustrating processing in the embodiment of the present invention.

First, the image input unit 10 receives an input of photograph image S0, which is a trimming object (step ST1). When the image input unit 10 receives the input, a multiplicity of sequential images S0 may be continuously received. Next, the tag information readout unit 20 reads out tag information TG, which is supplementary information attached to photograph image S0, from photograph image S0. Then, the tag information readout unit 20 obtains information, such as machine type m of photography apparatus M, which was used to obtain photograph image S0, input optical focal length Lin representing optical focal length of the photography apparatus during photography and input electronic zoom magnification ratio Nin representing the electronic zoom magnification ratio of the photography apparatus during photography, which is included in tag information TG. Then, the tag information readout unit 20 outputs the obtained information to the zoom magnification ratio judgment unit 30 (step ST2).

Next, the zoom magnification ratio judgment unit 30 reads out specification information about the zoom of the photography apparatus of machine type m from the database 40 and refers to the information. Then, the zoom magnification ratio judgment unit 30 judges whether the optical zoom magnification ratio specified by input optical focal length Lin is the maximum optical zoom magnification ratio that can be set by the photography apparatus of machine type m. The zoom magnification ratio judgment unit 30 also judges whether the electronic zoom magnification ratio represented by input electronic zoom magnification ratio Nin is the maximum electronic zoom magnification ratio that can be set by the photography apparatus of machine type m. Accordingly, judgment results ZJ are obtained (step ST3).

After judgment results ZJ are obtained, the trimming frame candidate setting unit 50 detects a predetermined kind of object, such as a human face, a plant, the ground, the sky and a structure. Then, the trimming frame candidate setting unit 50 calculates the degree of interest of each of detected objects and prepares a plurality of trimming frame candidates $q_i$ by taking the value of the degree of interest into consideration (step ST4). If judgment results ZJ show that both of the optical zoom magnification ratio and the electronic zoom magnification ratio during obtainment of photograph image S0 by photography apparatus M are maximum magnification ratios that can be set by the photography apparatus, the trimming frame setting unit 52 selects, as trimming frame X, a trimming frame candidate that has a smallest range from the plurality of trimming frame candidates. If judgment results ZJ are different from the aforementioned judgment results, the trimming frame setting unit 52 selects, as trimming frame X, a trimming frame candidate that has a largest range from the plurality of trimming range candidates (step ST5).

After trimming frame X is set, the trimming processing unit 60 cuts out an image surrounded by trimming frame X from photograph image S0. Accordingly, the trimming processing unit 60 obtains trimming image S1, which is a cutout image. Then, the trimming processing unit 60 enlarges trimming image S1 so that the image size of trimming image S1 becomes approximately the same as that of photograph image S0 (step ST6).

When trimming processing ends, the image correction unit 70 performs processing. If it is judged, based on judgment results ZJ, that the optical zoom magnification ratio specified by input optical focal length Lin is the maximum optical zoom magnification ratio that can be set by the photography apparatus of machine type m, the image correction unit 70 performs distortion correction processing on trimming image S1. If it is judged, based on judgment results ZJ, that the electric zoom magnification ratio represented by input electronic zoom magnification ratio Nin is the maximum electric zoom magnification ratio that can be set by the photography apparatus of machine type m, the image correction unit 70 performs sharpness processing on trimming image S1.

As described above, the image trimming apparatus according to the present embodiment judges whether the zoom magnification ratio of photography apparatus M during obtainment of photograph image S0 was the maximum magnification ratio, which corresponds to the limit of a zoom magnification ratio that can be set by photography apparatus M. If it is judged that the zoom magnification ratio is the maximum magnification ratio, a trimming frame candidate that has a smallest range is selected and set as trimming frame X of photograph image S0. Therefore, it is possible to infer whether the composition of the image is composition intended by the photographer or composition obtained against the intention of the photographer because of limitations in the zoom performance of the photograph apparatus. Then, trimming frame X can be set so that the inference result is reflected in setting of the trimming frame X. Hence, even if the composition of photograph image S0 is not desirable composition due to limits in the zoom magnification ratio of the photography apparatus, it is possible to perform trimming so that the composition of photograph image S0 is corrected in a desirable manner by taking the intension of the photographer into consideration.

In the present embodiment, a judgment is made as to whether the zoom magnification ratio during photography by photography apparatus M is the maximum magnification ratio. If it is judged that the zoom magnification ratio is the maximum magnification ratio, a candidate of which the frame has a smallest range is set as a trimming frame. Alternatively, a judgment may be made as to whether the zoom magnification ratio during photography by photography apparatus M is the minimum magnification ratio. Then, if it is judged that the zoom magnification ratio is the minimum magnification ratio, a candidate of which the frame has a largest range may be set as a trimming frame.

Further, if the number of set trimming frame candidates is greater than or equal to three, a judgment may be made as to whether the zoom magnification ratio of photography apparatus M during photography is the maximum magnification ratio. If it is judged that the zoom magnification ratio is the maximum magnification ratio, a candidate of which the frame has a smaller range than the range of a frame that is set if the magnification ratio is not judged to be the maximum magnification ratio may be set as a trimming frame. Alternatively, a judgment may be made as to whether the zoom magnification ratio of photography apparatus M during photography is the minimum magnification ratio. If it is judged that the zoom magnification ratio is the minimum magnification ratio, a candidate of which the frame has a larger range than the range of a frame that is set if the magnification ratio is not judged to be the minimum magnification ratio may be set as a trimming frame. For example, a plurality of trimming frame candidates may be set using the degree of interest obtained for each of the detected objects and a certain candidate may be selected, based on an element other than the degree of interest, as the most plausible candidate from the plurality of candidates. Then, if it is judged that the zoom magnification ratio during photography by photography apparatus M is the maximum magnification ratio, a candidate of which the size of the frame is one-stage smaller than that of the most plausible candidate may be selected and set as a trimming frame.

Further, if it is judged that the zoom magnification ratio of photography apparatus M during photography is not the maximum magnification ratio, or if it is judged that the zoom magnification ratio of photography apparatus M during photography is not the minimum magnification ratio, or if it is judged that the zoom magnification ratio of photography apparatus M during photography is the minimum magnification ratio, processing may be performed so that trimming is not performed.

If the zoom magnification ratio during photography by photography apparatus M is the minimum magnification ratio, it may be desirable that trimming is not performed at all by assuming that a wide angle image intended by the photographer was not obtained because of limitations in the zoom performance. However, the purpose of trimming is not limited to so-called zoom-trimming for enlarging and cutting out a specific subject. Trimming may also be performed to correct the composition of an image so that balanced composition is obtained by removing an excess region from the image (for example, if a human face is cut at the outer edge of the image and only half of the human face is included in the image, the outer region of the image is removed so that the human face is excluded, or the like). When trimming is performed by giving priority to the latter purpose, namely to obtain balanced composition by removing an excess region, a minimum region may be removed by trimming. Further, even if the zoom magnification of photography apparatus M during photography is the minimum magnification ratio, the photographer may not have particularly intended to obtain an image with a wide angle of view. Therefore, trimming may be intentionally performed even if the zoom magnification ratio of photography apparatus M during photography is the minimum magnification ratio.

So far, preferred embodiments of the present invention have been described. However, the method and the apparatus of the present invention and the program for the method and the apparatus are not limited to the aforementioned embodiments. Various kinds of addition/reduction or modification may be made without deviating from the gist of the present invention.

What is claimed is:

1. An image trimming method for automatically trimming a photograph image photographed by a photography means, the method comprising:
   setting a plurality of trimming range candidates by analyzing the photograph image;
   judging whether the zoom magnification ratio of the photography means during the photography of the photograph image corresponds to a predetermined limit, the limit being a maximum zoom magnification ratio that can be set by the photography means; and
   setting a trimming range by selecting one of the plurality of trimming range candidates as the trimming range, wherein:
   if the zoom magnification ratio is judged to be the maximum magnification ratio, a trimming range candidate that has a smaller range than that of a trimming range candidate selected if the zoom magnification ratio is judged not to be the maximum magnification ratio is selected as the trimming range;
   if the zoom magnification ratio is judged to be the maximum magnification ratio, a trimming range may be set by selecting a candidate of which the range is the smallest from the plurality of candidates; and if the zoom magnification ratio is judged to be not the maximum magnification ratio, a trimming range may be set by selecting a candidate other than a candidate of which the range is the smallest from the plurality of candidates;
   the zoom magnification ratio includes an optical zoom magnification ratio and an electronic zoom magnification ratio of the photography means during the photography; and
   the zoom magnification ratio is judged to be the maximum zoom magnification ratio when the optical zoom magnification ratio and the electronic zoom magnification ratio are both maximal;
   wherein the plurality of trimming range candidates is set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

2. An image trimming method, as defined in claim 1, the method further comprising:
   obtaining zoom magnification ratio information for specifying the zoom magnification ratio and machine type information representing the machine type of the photography means, wherein the judgment as to the zoom magnification ratio is made referring to a specification of a zoom corresponding to the machine type represented by the machine type information, the specification of the zoom being selected from specifications of zooms of photography means of respective machine types, the specifications being prepared in advance.

3. An image trimming method, as defined in claim 1, wherein a judgment is made as to whether the optical zoom magnification ratio is a maximum magnification ratio, and wherein if the optical zoom magnification ratio is judged to be the maximum magnification ratio, distortion correction processing is performed on an image in the trimming range.

4. An image trimming method, as defined in claim 1, wherein a judgment is made as to whether the electronic zoom magnification ratio is a maximum magnification ratio, and wherein if the electronic zoom magnification ratio is judged to be the maximum magnification ratio, sharpness processing is performed on an image in the trimming range.

5. An image trimming apparatus for automatically trimming a photograph image photographed by a photography means, the apparatus comprising:
   a trimming range candidate setting means for setting a plurality of trimming range candidates by analyzing the photograph image;
   a zoom magnification ratio judgment means for judging whether the zoom magnification ratio of the photography means during the photography of the photograph image corresponds to a predetermined limit, the limit being a maximum zoom magnification ratio that can be set by the photography means; and
   a trimming range setting means for setting a trimming range by selecting one of the plurality of trimming range candidates as the trimming range, wherein:
   if the zoom magnification ratio is judged to be the maximum magnification ratio, a trimming range candidate that has a smaller range than that of a trimming range candidate selected if the zoom magnification ratio is judged not to be the maximum magnification ratio is selected as the trimming range;
   if the zoom magnification ratio is judged to be the maximum magnification ratio, a trimming range may be set by selecting a candidate of which the range is the smallest from the plurality of candidates; and if the zoom magnification ratio is judged to be not the maximum magnification ratio, a trimming range may be set by selecting a candidate other than a candidate of which the range is the smallest from the plurality of candidates;
   the zoom magnification ratio includes an optical zoom magnification ratio and an electronic zoom magnification ratio of the photography means during the photography; and
   the zoom magnification ratio is judged to be the maximum zoom magnification ratio when the optical zoom magnification ratio and the electronic zoom magnification ratio are both maximal;
   wherein the plurality of trimming range candidates is set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

6. An image trimming apparatus, as defined in claim 5, the apparatus further comprising:
- an information obtainment means for obtaining zoom magnification ratio information for specifying the zoom magnification ratio and machine type information representing the machine type of the photography means; and
- a storage means for storing specifications of zooms of photography means of respective machine types, wherein the zoom magnification ratio judgment means judges by referring to a specification of a zoom corresponding to the machine type represented by the machine type information, the specification of the zoom being selected from the specifications of the zooms stored in the storage means.

7. An image trimming apparatus, as defined in claim 5, wherein the trimming range candidate setting means sets the plurality of trimming range candidates by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

8. An image trimming apparatus, as defined in claim 5, wherein the zoom magnification ratio judgment means judges whether the optical zoom magnification ratio is a maximum magnification ratio, the apparatus further comprising:
- a distortion correction processing means, wherein if the optical zoom magnification ratio is judged to be the maximum magnification ratio, the distortion correction processing means performs distortion correction processing on an image in the trimming range.

9. An image trimming apparatus, as defined in claim 5, wherein the zoom magnification ratio judgment means judges whether the electronic zoom magnification ratio is a maximum magnification ratio, the apparatus further comprising:
- a sharpness processing means, wherein if the electronic zoom magnification ratio is judged to be the maximum magnification ratio, the sharpness processing means performs sharpness processing on an image in the trimming range.

10. A non-transitory computer readable medium storing a program for causing a computer to function as an image trimming apparatus for automatically trimming a photograph image photographed by a photography means, wherein the computer functions as:
- a trimming range candidate setting means for setting a plurality of trimming range candidates by analyzing the photograph image;
- a zoom magnification ratio judgment means for judging whether the zoom magnification ratio of the photography means during the photography of the photograph image corresponds to a predetermined limit, the limit being a maximum zoom magnification that can be set by the photography means; and
- a trimming range setting means for setting a trimming range by selecting one of the plurality of trimming range candidates as the trimming range, wherein if the zoom magnification ratio is judged to be a the maximum magnification ratio, a trimming range candidate that has a smaller range than that of a trimming range candidate selected if the zoom magnification ratio is judged not to be the maximum magnification ratio is selected as the trimming range;
- if the zoom magnification ratio is judged to be the maximum magnification ratio, a trimming range may be set by selecting a candidate of which the range is the smallest from the plurality of candidates; and if the zoom magnification ratio is judged to be not the maximum magnification ratio, a trimming range may be set by selecting a candidate other than a candidate of which the range is the smallest from the plurality of candidates;
- the zoom magnification ratio includes an optical zoom magnification ratio and an electronic zoom magnification ratio of the photography means during the photography; and
- the zoom magnification ratio is judged to be the maximum zoom magnification ratio when the optical zoom magnification ratio and the electronic zoom magnification ratio are both maximal;
- wherein the plurality of trimming range candidates is set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

11. The non-transitory computer readable medium storing a program, as defined in claim 10, wherein the computer further functions as:
- an information obtainment means for obtaining zoom magnification ratio information for specifying the zoom magnification ratio and machine type information representing the machine type of the photography means; and
- a storage means for storing specifications of zooms of photography means of respective machine types, wherein the zoom magnification ratio judgment means judges by referring to a specification of a zoom corresponding to the machine type represented by the machine type information, the specification of the zoom being selected from the specifications of the zooms stored in the storage means.

12. The non-transitory computer readable medium storing a program, as defined in claim 10, wherein the trimming range candidate setting means sets the plurality of trimming range candidates by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

13. The non-transitory computer readable medium storing a program, as defined in claim 10, wherein the zoom magnification ratio judgment means judges whether the optical zoom magnification ratio is a maximum magnification ratio, the program for causing the computer to further function as:
- a distortion correction processing means, wherein if the optical zoom magnification ratio is judged to be the maximum magnification ratio, the distortion correction processing means performs distortion correction processing on an image in the trimming range.

14. The non-transitory computer readable medium storing a program, as defined in claim 10, wherein the zoom magnification ratio judgment means judges whether the electronic zoom magnification ratio is a maximum magnification ratio, the program for causing the computer to further function as:

a sharpness processing means, wherein if the electronic zoom magnification ratio is judged to be the maximum magnification ratio, the sharpness processing means performs sharpness processing on an image in the trimming range.

15. An image trimming method for automatically trimming a photograph image photographed by a photography means, the method comprising:

setting a plurality of trimming range candidates by analyzing the photograph image;

judging whether the zoom magnification ratio of the photography means during the photography of the photograph image corresponds to a predetermined limit, the limit being a minimum zoom magnification ratio that can be set by the photography means; and setting a trimming range by selecting one of the plurality of driving range candidates as the trimming range,
wherein:

if the zoom magnification ratio is judged to be the minimum magnification ratio, a trimming range candidate that has a larger range than that of a trimming range candidate selected if the zoom magnification ratio is judged not to be the minimum magnification ratio is selected as the trimming range;

if the zoom magnification ratio is judged to be the minimum magnification ratio, a trimming range may be set by selecting a candidate of which the range is the largest from the plurality of candidates; and if the zoom magnification ratio is judged to be not the minimum magnification ratio, a trimming range may be set by selecting a candidate other than a candidate of which the range is the largest from the plurality of candidates;

the zoom magnification ratio includes an optical zoom magnification ratio and an electronic zoom magnification ratio of the photography means during the photography; and the zoom magnification ratio is judged to be the minimum zoom magnification ratio when the optical zoom magnification ratio and the electronic zoom magnification ratio are both minimal;

wherein the plurality of trimming range candidates is set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

16. An image trimming apparatus having a processing unit having a plurality of modules for automatically trimming a photograph image photographed by a photograph capturing device, comprising:

a trimming range candidate setting module adapted to set a plurality of trimming range candidates by analyzing the photograph image;

a zoom magnification ratio judging module configure to judge whether the zoom magnification ratio of the photography means during the photography of the photograph image corresponds to a predetermined limit, the limit being a minimum zoom magnification ratio that can be set by the photography means; and a trim range setting module adapted to set a trimming range by selecting one of the plurality of driving range candidates as the trimming range,
wherein:

if the zoom magnification ratio is judged to be the minimum magnification ratio, a trimming range candidate that has a larger range than that of a trimming range candidate selected if the zoom magnification ratio is judged not to be the minimum magnification ratio is selected as the trimming range;

if the zoom magnification ratio is judged to be the minimum magnification ratio, a trimming range may be set by selecting a candidate of which the range is the largest from the plurality of candidates; and if the zoom magnification ratio is judged to be not the minimum magnification ratio, a trimming range may be set by selecting a candidate other than a candidate of which the range is the largest from the plurality of candidates;

the zoom magnification ratio includes an optical zoom magnification ratio and an electronic zoom magnification ratio of the photography means during the photography; and the zoom magnification ratio is judged to be the minimum zoom magnification ratio when the optical zoom magnification ratio and the electronic zoom magnification ratio are both minimal;

wherein the plurality of trimming range candidates is set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

17. A non-transitory computer readable medium having instructions for causing a processor to execute an image trimming method for automatically trimming a photograph image photographed by a photography means, the method comprising:

setting a plurality of trimming range candidates by analyzing the photograph image;

judging whether the zoom magnification ratio of the photography means during the photography of the photograph image corresponds to a predetermined limit, the limit being a minimum zoom magnification ratio that can be set by the photography means; and setting a trimming range by selecting one of the plurality of driving range candidates as the trimming range,
wherein:

if the zoom magnification ratio is judged to be the minimum magnification ratio, a trimming range candidate that has a larger range than that of a trimming range candidate selected if the zoom magnification ratio is judged not to be the minimum magnification ratio is selected as the trimming range;

if the zoom magnification ratio is judged to be the minimum magnification ratio, a trimming range may be set by selecting a candidate of which the range is the largest from the plurality of candidates; and if the zoom magnification ratio is judged to be not the minimum magnification ratio, a trimming range may be set by selecting a candidate other than a candidate of which the range is the largest from the plurality of candidates;

the zoom magnification ratio includes an optical zoom magnification ratio and an electronic zoom magnification ratio of the photography means during the photography; and the zoom magnification ratio is judged to be the minimum zoom magnification ratio when the optical zoom magnification ratio and the electronic zoom magnification ratio are both minimal;

wherein the plurality of trimming range candidates is set by detecting a predetermined object included in the photograph image and by calculating the degree of interest of the detected object using a characteristic including at least one of the type of the object, the brightness of the object, the size of the object and the position of the object for each detected object so that each of the plurality of trimming range candidates includes an object, of which the calculated degree of interest is greater than or equal to a predetermined threshold value.

\* \* \* \* \*